US007032623B2

(12) United States Patent
Averbuch et al.

(10) Patent No.: US 7,032,623 B2
(45) Date of Patent: Apr. 25, 2006

(54) FLEXIBLE PIPE WITH HIGH AXIAL COMPRESSION STRENGTH AND METHOD FOR MAKING SAME

(75) Inventors: Daniel Averbuch, Rueil Malmaison (FR); Jean-Marc Leroy, Rueil Malmaison (FR); Alain Coutarel, Mont Saint Aignan (FR)

(73) Assignees: Coflexip, Paris (FR); Institut Francais du Petrole, Ruil Malmaison Cedex (FR)

( * ) Notice: Subject to any disclaimer, the term of this patent is extended or adjusted under 35 U.S.C. 154(b) by 10 days.

(21) Appl. No.: 10/499,720

(22) PCT Filed: Dec. 10, 2002

(86) PCT No.: PCT/FR02/04256

§ 371 (c)(1), (2), (4) Date: Oct. 20, 2004

(87) PCT Pub. No.: WO03/056224

PCT Pub. Date: Jul. 10, 2003

(65) Prior Publication Data

US 2005/0039811 A1 Feb. 24, 2005

(30) Foreign Application Priority Data

Dec. 21, 2001 (FR) .................................. 01 16653

(51) Int. Cl.
*F16L 11/00* (2006.01)

(52) U.S. Cl. ...................................... 138/129; 138/133

(58) Field of Classification Search ................ 138/129, 138/133, 134, 154
See application file for complete search history.

(56) References Cited

U.S. PATENT DOCUMENTS

| | | | | |
|---|---|---|---|---|
| 4,402,346 | A * | 9/1983 | Cheetham et al. | 138/129 |
| 5,024,252 | A * | 6/1991 | Ochsner | 138/130 |
| 5,579,809 | A * | 12/1996 | Millward et al. | 138/174 |
| 5,813,439 | A | 9/1998 | Herrero | |
| 5,934,335 | A * | 8/1999 | Hardy | 138/131 |
| 6,053,213 | A * | 4/2000 | Jung et al. | 138/130 |
| 6,065,501 | A * | 5/2000 | Feret et al. | 138/134 |
| 6,688,339 | B1 * | 2/2004 | Yamaguchi et al. | 138/129 |
| 6,691,743 | B1 * | 2/2004 | Espinasse | 138/134 |

FOREIGN PATENT DOCUMENTS

| | | |
|---|---|---|
| FR | 2229912 | 12/1974 |
| NL | 7711212 | 4/1979 |

* cited by examiner

*Primary Examiner*—James Hook
(74) *Attorney, Agent, or Firm*—Antonelli, Terry, Stout and Kraus, LLP.

(57) ABSTRACT

The present invention relates to a flexible pipe structure wherein transverse displacement caused by buckling of the elongate elements of a tensile armouring layer when the pipe is being laid or used in deep sea is limited. The invention aims to reduce the play between the elongate elements of the tensile armouring layer so as to limit transverse displacement possibilities while providing the pipe with the required flexibility and mechanical characteristics. The elongate elements can freely move longitudinally in relation to one another to ensure flexibility of the pipe.

19 Claims, 1 Drawing Sheet

FLEXIBLE PIPE WITH HIGH AXIAL COMPRESSION STRENGTH AND METHOD FOR MAKING SAME

FIELD OF THE INVENTION

The present invention relates to a flexible pipe structure and to a method for making same. The object of the invention is to limit buckling of the elongate elements used as mechanical reinforcement armouring for the structure of a flexible pipe.

Flexible pipes are notably used in the petroleum industry for carrying petroleum from a wellhead located at the sea bottom to process facilities located at the surface. The pipes laid on the sea bottom, commonly referred to as flowlines, mainly undergo static mechanical stresses, whereas the pipes connecting the sea bottom to the surface, commonly referred to as risers, undergo static and dynamic mechanical stresses.

The term wire used in the present description refers to elongate elements one dimension of which is very large in relation to the others.

FIELD OF THE INVENTION

The structure of a flexible pipe, notably described in standards API 17 B and API 17 J established by the American Petroleum Institute under the title "Recommended Practice for Flexible Pipe", generally has the form of a tube consisting of reinforcing wire layers providing mechanical strength and of polymer sheaths providing sealing. The reinforcing wires are wound helically around the flexible pipe so as to form various superposed cylindrical layers whose axes merge with the axis of the tube. The wires wound at an angle close to 90° in relation to the axis of the tube form layers commonly referred to as casing or spiral pressure layer, notably contributing to the inside and/or outside pressure resistance of the flexible pipe, whereas the wires wound at an angle ranging between 25° and 55° in relation to the axis of the tube form layers commonly referred to as tensile armouring, mainly contributing to the tensile and axial compression strength of the flexible pipe.

During the laying operation, a boat brings on the oil field site the flexible pipe wound around reels. During lowering of the flexible pipe into the sea, the end of the pipe that is immersed in the water is closed by means of a plug. This measure affords two advantages. On the one hand, it prevents the flexible pipe from being filled with unwanted seawater during the following operations and, on the other hand, it allows to benefit by the buoyancy effect which reduces the weight applied to the pipe at the sea surface. However, in deep-sea structures, closing the end of the pipe lowered into the sea has drawbacks. In fact, the flexible pipe is subjected to high axial compression stresses due to the outside hydrostatic pressure, which are applied onto the end of the pipe. This phenomenon is referred to as "inverse bottom effect". Depending on the anchoring mode at the sea bottom, the flexible pipe can also undergo the "inverse bottom effect" during service.

The compression stresses applied on the end of the pipe cause a tendency to axial shortening of the pipe. The reinforcing wires and more particularly the wires of the tensile armouring layers are compressed and likely to deform through lateral and/or radial buckling.

To prevent deformation through buckling of the wires of the tensile armouring layers in the radial direction of the pipe, a hooping strip is arranged on the parts of the pipe sensitive to buckling. The tensile armouring layers are circumferentially surrounded with a sufficiently resistant strip to prevent displacement in the radial direction towards the outside of the pipe. The layer arranged on a smaller radius than the radius of the tensile armouring layers, notably intended to provide collapse strength of the flexible pipe, prevents displacement of the wires in the radial direction towards the inside of the pipe.

However, by hooping the pipe with a strip, only deformations in the radial direction are prevented. The wires remain free in the space defined by the hooping strip and the layer arranged on a smaller radius than the radius of the tensile armouring layer. Now, the pipe manufacturing method and the pipe flexibility specification require a play between the wires forming a tensile armouring layer. Thus, after manufacture, the wires of the tensile armouring layers are distributed at substantially regular intervals on the circumference of the pipe. On the other hand, when the pipe is laid in deep sea (depths greater than 1500 m), where the outside pressure is very high and the pipe undergoes flexural deformations, transverse displacements of the wires are observed in said space. As a result of dynamic stresses exerted on a flexible pipe, for example during service of a pipe connecting the sea bottom to the surface, transverse displacements of the wires are also observed in said space. The transverse displacements of the wires are substantially perpendicular to the direction of the greatest dimension of the wires, the wires remaining substantially in the space defined by the hooping strip and the layer arranged on a smaller radius than the radius of the tensile armouring layer. The transverse displacements of the wires tend to fill in certain plays between wires and to enlarge others depending on the flexural deformation cycles imposed on the pipe. These displacements occur in an uneven manner. After transverse displacements, some wires may be isolated, i.e. they are no longer in contact with the adjacent wires, whereas other wires are grouped together. This isolation favours lateral buckling of the wires when the pipe undergoes compressive stresses because an isolated wire is not supported by the adjacent wires.

The goal of the invention is to limit transverse displacements of the reinforcing wires that form tensile armouring layers of a flexible pipe in order to prevent lateral buckling of the armouring wires.

It is possible to increase the width of the reinforcing wires so as to increase the flexural strength in order to limit transverse displacement of the wires. However, this solution is limited by the maximum allowable size of the wires, it imposes higher stresses in the tensile armourings.

Analysis of the behaviour of flexible pipes subjected to axial compression stresses shows that, in order to limit the transverse displacement phenomenon, it is useful to control the play between the reinforcing wires that form a layer in order to limit the wire motion and deformation possibilities.

U.S. Pat. No. 5,813,439 proposes a flexible pipe without a spiral pressure layer, wherein a first tensile armouring layer consists of clamped armouring wires. The purpose of clamping is to allow this armouring layer to withstand the inside pressure stresses that are usually taken up by the pressure layer. Thus, this pipe is a flexible pipe without a spiral pressure layer whose clamping is notably intended to limit out-of-joint armouring wires so as to prevent creep of the pressure sheath on which the clamped armouring layer is wound. The clamped armouring layer is preferably armoured at an angle close to the equilibrium angle of 55°. In this type of pipe, clamping is performed only on the first armouring layer, whereas the other layers are conventionally made, and it is therefore not intended to limit lateral buckling of the armouring wires.

Patent WO-99/66,246 provides a flexible pipe comprising reinforcing wires embedded in a polymer matrix. This type of pipes, referred to as bonded in the trade, allows no or very little longitudinal motion of the armouring wires. The position of the wires is thus imposed by the matrix, but extrusion of the matrix requires new manufacturing means and methods for the flexible pipe.

SUMMARY OF THE INVENTION

The object of the present invention is to provide a flexible pipe structure wherein transverse displacement of the wires of a tensile armouring layer when flexible pipes are being laid or used in deep sea is limited while the drawbacks of the prior art are overcome. The invention proposes new layouts for the wires forming tensile armouring layers of flexible pipes and a method of manufacturing such pipes.

The present invention aims to limit the play between the reinforcing wires of a tensile armouring layer so as to reduce transverse motions while keeping the pipe flexibility. The wires can freely move in the direction of the greatest dimension of the wires. In order to control the play between two wires of an armouring layer, on the one hand, the invention aims to limit the global play, i.e. the value of the sum of the plays between wires measured on the circumference of an armouring layer and, on the other hand, the invention aims to limit the maximum value of the play between two contiguous wires.

In general terms, the invention is defined by a method of manufacturing a flexible pipe comprising at least one tensile armouring layer including elongate reinforcing elements arranged helically around the axis of the pipe, the elongate elements having a width L and forming an angle α in relation to the axis of the pipe. The play separating two contiguous elements, measured on said circumference, is less than $$\frac{1.5 \cdot L}{\cos\alpha}.$$

According to the method of the invention, the sum of the plays between the elongate elements measured on the circumference of the tensile armouring layer can be less than 5% of said circumference, preferably less than 3%.

According to the method of the invention, the number of elongate elements can be calculated considering the angle of inclination of the helix in relation to the axis of the pipe, the dimensions of the sections of the elongate reinforcing elements and the mean diameter of the tensile armouring layer. It is also possible to calculate the number of intermediate elongate elements of known dimensions to be arranged in the plays between the elongate reinforcing elements considering the number of elongate reinforcing elements, the angle of inclination of the helix in relation to the axis of the pipe, the dimensions of the sections of the elongate reinforcing elements and the mean diameter of the tensile armouring layer. The thickness of the coating applied onto the elongate reinforcing elements can also be calculated considering the number of elongate reinforcing elements, the angle of inclination of the helix in relation to the axis of the pipe, the dimensions of the sections of the elongate reinforcing elements and the mean diameter of the tensile armouring layer.

According to the method of the invention, the elongate reinforcing elements of an armouring layer can be clamped to one another. The plays between the elongate reinforcing elements can be filled in with a filling material.

The present invention also relates to a flexible pipe comprising a tensile armouring layer including elongate reinforcing elements arranged helically around the axis of the pipe, the elongate elements having a width L and forming an angle α in relation to the axis of the pipe, characterized in that the play separating two contiguous elements measured on said circumference is less than $$\frac{1.5 \cdot L}{\cos\alpha}.$$

The sum of the plays between the elongate elements measured on the circumference of the tensile armouring layer can be less than 5% of said circumference, preferably less than 3%.

According to the invention, the elongate reinforcing elements of the flexible pipe can be coated with a layer of a plastic material, the plastic material being selected from the group consisting of: polyamide 11, polyurethane and polyvinylidene fluoride.

According to the invention, the flexible pipe can comprise an intermediate elongate element arranged between two elongate reinforcing elements. The intermediate elongate element can be of rectangular section or of T-shaped or U-shaped section. The intermediate elongate element is made of a material selected from the group consisting of: steel, polyamide 11, polyurethane and polyvinylidene fluoride.

The flexible pipe according to the invention can comprise a layer made of the same material as the intermediate elongate element, this layer covering the armouring layer.

According to the invention, the elongate reinforcing elements of the flexible pipe can be clamped.

According to the invention, the plays between the elongate reinforcing elements of the flexible pipe can be filled in with a filling material.

The major advantage of the layout of the wires according to the invention is to eliminate the possibilities of transverse displacement of the wires while providing the pipe with the required flexibility and mechanical characteristics. On the one hand, the reinforcing wires can freely move longitudinally in relation to one another to ensure flexibility of the pipe and, on the other hand, the mechanical characteristics of the pipe as regards tensile stresses are not modified.

Furthermore, when the reinforcing wires are in contact with plastic elements, these elements limit contact fatigue and thus prevent wear of the wires.

Besides, the method of manufacturing the flexible pipes remains unchanged.

BRIEF DESCRIPTION OF THE FIGURES

Other features and advantages of the invention will be clear from reading the description hereafter of several embodiments of the present invention, illustrated by the accompanying drawings wherein.

DETAILED DESCRIPTION

In the present description, the figures referred to as "sectional view of a layer" correspond to a section perpendicular to the axis of the pipe. Only some wires of one or more armouring layers are shown, regardless of the curvature of the layers.

Figure 1:
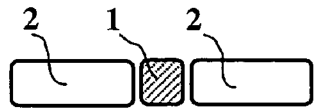
FIGS. 1 and 2 show in sectional view a tensile armouring layer consisting of reinforcing wires and of intermediate wires.
Figure 2:
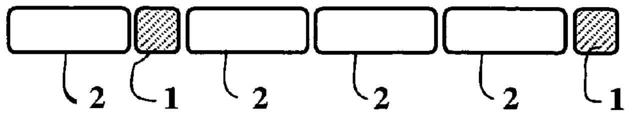

According to a first embodiment of the invention illustrated by FIG. 1, a tensile armouring layer is made by depositing an intermediate wire (1) between two reinforcing wires (2). The laying frequency of an intermediate wire between two reinforcing wires notably depends on the size of the pipe and of the wires, and on the performances of the tensile armouring layer manufacturing means. As shown in FIG. 2, intermediate wires (1) can be evenly deposited after three consecutive reinforcing wires (2). The intermediate wires can also be unevenly distributed on the circumference of the layer. Laying of reinforcing wires (2) and of intermediate wires (1) of the tensile armouring layers on the flexible pipe is carried out according to the manufacturing principle known from the prior art.

The section of a wire designates a view along a section orthogonal to the direction of the wire length. The thickness of the wire designates a dimension of the wire section, the thickness extending in a radial direction of the pipe when the wire is laid on the pipe. The width L of the wire designates a dimension of the wire section, the width extending in the tangential direction to the pipe when the wire is laid on the pipe.

The reinforcing wires and the intermediate wires preferably have a rectangular cross-section. This geometry allows the wire to be brought into contact with the other elements of the flexible pipe according to stable plane/plane bonds. In general, the two surfaces of the wire of greater dimension are brought into contact with the upper and lower layers, whereas the two surfaces of smaller dimension are in contact with the neighbouring wires of the same layer. The side of greater dimension of the rectangular section of a wire is referred to as the width of the wire.

The purpose of laying intermediate wires is to reduce the play between the wires forming a layer. The play available between the wires forming a layer is defined by the sum of the plays between the various wires, the plays being measured on the circumference of the layer in the plane perpendicular to the axis of the flexible pipe. This available play can be expressed in percentage: the sum of the plays divided by the circumference of the layer.

According to the prior art, for a flexible pipe of inside diameter 12 inches, the mean diameter of the tensile armouring layers is approximately 380 mm and the available play is about 10% of the circumference, i.e. approximately 120 mm. When using reinforcing wires of rectangular section, 12 mm in width, arranged at an angle of 35° in relation to the axis of the flexible pipe, a tensile armouring layer consists of 77 reinforcing wires.

The invention aims to limit the available play of the tensile armouring layer to approximately 2.5%. Thus, for the pipe of inside diameter 12 inches, 15 5-mm wide intermediate wires or 25 3-mm wide intermediate wires can for example be arranged in the plays of the tensile armouring layer comprising 77 reinforcing wires.

In order to have a substantially zero available play, 20 5-mm wide intermediate wires or 34 3-mm wide intermediate wires can for example be arranged in the plays of the tensile armouring layer.

Figure 3:
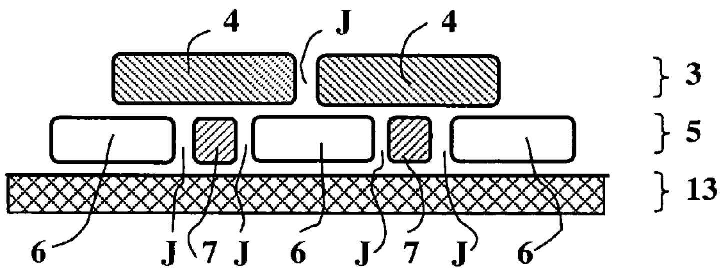
FIG. 3 is a sectional view of two superposed tensile armouring layers.
Figure 4:
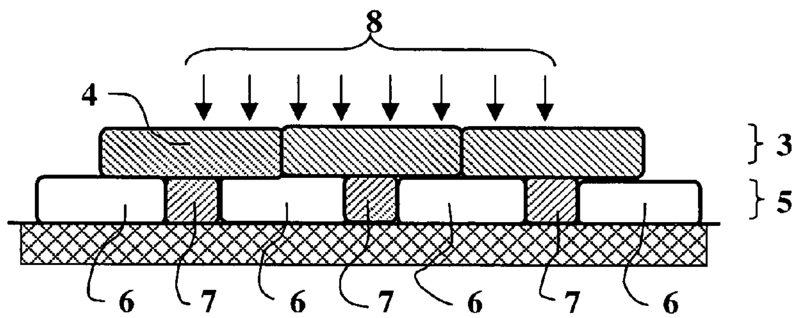
FIG. 4 is a sectional view of two tensile armouring layers subjected to a pressure.

FIGS. 3 and 4 show an improvement of the embodiment shown in FIGS. 1 and 2. A tensile armouring layer (5) is arranged according to the embodiment of FIG. 1. Reinforcing wires (6) alternate with intermediate wires (7). Then, a layer (3) of wires (4) is arranged on the outer surface of layer (5). Wires (4) and (7) are preferably made from a more supple material than the material used for reinforcing wires (6). A play, denoted by (J) in FIG. 3, separates the wires of layer (3) and (5). Without departing from the scope of the invention, layer (3) can be arranged on the inner surface of layer (5). Wires (4) are arranged so as to cover the entire surface, outer or inner, of layer (5) and so that the interstices between two wires (4) are not opposite an interstice between two wires of layer (5). According to another embodiment, layer (3) can be a continuous layer directly deposited on layer (5), for example a layer made of a thermoplastic material extruded on layer (5).

FIG. 3 shows elements of a flexible pipe as they are after the manufacturing operation. The plays (J) shown between the wires of a layer are reduced to the minimum while remaining of positive value.

FIG. 4 shows the elements of a tensile armouring layer, according to the layout of FIG. 3, as they are during lowering of the flexible pipe onto the sea bottom. The hydrostatic pressure, whose direction of action is shown by arrows (8), applies onto layer (3). This pressure presses layers (3) and (5) against layer (13) underlying layer (5). Wires (4) and (7), made of a more supple material than the reinforcing wires, are deformed so as to fill in and to remove plays (J) between the various wires of layers (3) and (5) and between the wires of layer (3) and of layer (5). Thus, by selecting the material of wires (4) and (7) almost incompressible, the layout of the tensile armouring layer is nearly fixed after deformation of wires (4) and (7). However, the pipe remains flexible because of the possibility of longitudinal motions of the wires. The longitudinal motions are directed substantially in the directions of the greatest dimension of the wires.

The material of wires (4) and (7) is also selected so as to facilitate gliding of the contacts of reinforcing wires (6) with wires (4) and (7) and of wires (4) with wires (7) and to prevent wear of the wires.

Figure 5:
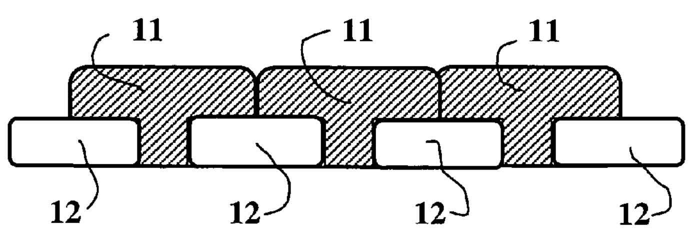
FIG. 5 is a sectional view of a tensile armouring layer consisting of reinforcing wires and of intermediate wires of T-shaped section.

In FIG. 5, wires (4) and (7) shown in FIG. 4 are combined into a single wire of T-shaped section. Thus, the tensile armouring layer consists of intermediate wires (11) of T-shaped section deposited alternately with reinforcing wires (12). The base of the T is oriented in a radial direction in relation to the pipe and it separates two reinforcing wires (12), whereas the top of the T forms the inner or outer surface of the layer. The layer thus obtained behaves in the same way as the layout illustrated in FIG. 4. T-shaped intermediate wires (11) can also be deposited so as to leave several contiguous reinforcing wires (12).

Figure 6:
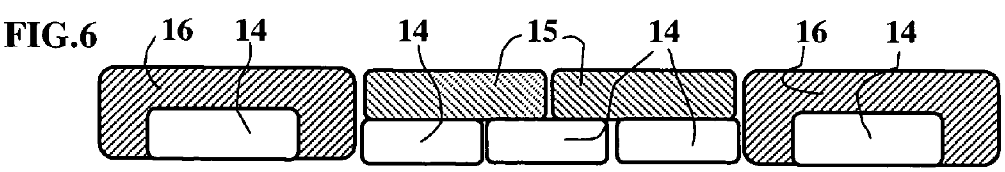
FIG. 6 is a sectional view of a tensile armouring layer consisting of reinforcing wires and of intermediate wires of U-shaped section.

In FIG. 6, wires (4) and (7) shown in FIG. 4 are combined into a single wire of U-shaped section. U-shaped intermediate wire (16) envelops a reinforcing wire (14) and covers three faces thereof. U-shaped intermediate wires (16) can be deposited more or less frequently alternately with reinforcing wires (14). In FIG. 6, an intermediate wire (16) is arranged every four reinforcing wires (14). The reinforcing wires that are not enveloped by a U-shaped intermediate wire (16) are covered on one face by wires (15) so as to obtain a tensile armouring layer whose outer surface is substantially cylindrical.

To make the tensile armouring layers of FIGS. 1, 2, 3, 4, 5 and 6, the dimensions of the reinforcing wires and of the intermediate wires are determined so as to allow easy mounting and to provide the flexible pipe with the required mechanical strength and flexibility characteristics. Considering the requirements relative to the dimensions of the wires, a tensile armouring layer whose play between two successive wires is reduced to the minimum is preferably manufactured. However, to facilitate laying of the wires on the flexible pipe, the value of the play between the wires is preferably positive. Consequently, the minimum value of the play between two successive wires of a layer is notably imposed by the performances of the flexible pipe manufacturing method.

The reinforcing wires can be made of a metal such as steel. They can also be made of a reinforced plastic material such as a polyamide 11 containing glass or carbon fibers.

The intermediate wires can be made of a plastic material of any type, for example thermoplastic, thermosetting polymer, or an elastomer such as polyamide 11, polyurethane or polyvinylidene fluoride. The plastic material can be reinforced by carbon fibers, glass fibers, aramid fibers or by any other type of reinforcing substance. The intermediate wires can also consist of wires made of a metal identical to or different from the metal used for the reinforcing wires.

Figure 7:
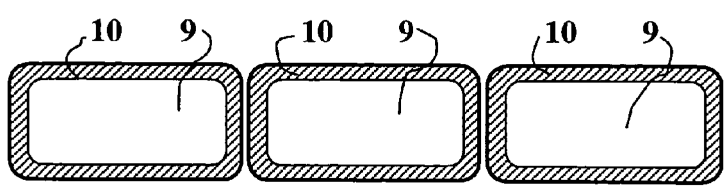
FIG. 7 is a sectional view of a tensile armouring layer consisting of wires coated with a plastic material.

FIG. 7 shows a second embodiment of the invention. Reinforcing wires (9) forming the tensile armouring layer are coated with a sheath (10) made of a more supple material than the material used for the reinforcing wires. A sheath (10) can be applied onto a reinforcing wire (9). Without departing from the scope of the invention, the reinforcing wires can be coated with a more supple material than the material used for the reinforcing wires on certain faces only. For example, only the faces in contact with the elements of a tensile armouring layer are coated with such a material. Any method known to the man skilled in the art can be used for coating the reinforcing wires, notably extrusion, splash, sticking.

The tensile armouring layer of FIG. 7 is made using also the helical laying principle used for reinforcing wires (9) but, before the laying operation, sheath (10) is applied. The reinforcing wires provided with a sheath are laid on the flexible pipe in such a way that the play between two successive wires of the layer formed is very small or zero.

According to the prior art, for a flexible pipe of inside diameter 12 inches, the mean diameter of the tensile armouring layers is approximately 380 mm and the available play is about 10%, i.e. approximately 120 mm. When using 12-mm wide reinforcing wires of rectangular section arranged at an angle of 35° in relation to the axis of the flexible pipe, a tensile armouring layer consists of 77 reinforcing wires.

Thus, for the pipe of 12 inches in inside diameter, the 77 wires can be provided with a 0.5-mm thick material layer in order to limit the available play of the armouring layer to about 2.5%.

Coating (10) of wires (9) can be made of a plastic material of any type, for example thermoplastic, thermosetting polymer or an elastomer such as polyamide 11, polyurethane or polyvinylidene fluoride. The plastic material can be reinforced with carbon fibers, glass fibers, aramid fibers or any other type of reinforcing material. The coating can also be made of a ceramic material.

It is possible to combine the various implementation modes of the invention described in connection with FIGS. 1, 2, 3, 5, 6 and 7 without departing from the scope of the invention.

According to a third embodiment of the invention, each wire forming a tensile armouring layer is clamped to the neighbouring wires of the same armouring layer. For example, the section of the wires can be T-shaped or U-shaped. This clamping allows to control the interstice between two contiguous armouring wires. It is also possible to limit displacement of the wires. When the flexible pipe is in service, each wire is held in place at the point where the buckling stress is maximum by an adjacent wire having a lower buckling stress.

According to a fourth embodiment, the plays between the wires of an armouring layer are filled in by a filling material, for example a thermoplastic, thermosetting or elastomeric polymer. The filling material has to be selected according to its aptitude to withstand compression so as to limit transverse motion of the wires while preventing migration of the armourings when the pipe is in service. The filling material must allow longitudinal motion of the reinforcing wires of a layer, i.e. it must not grip the reinforcing wires. The filling material is preferably injected after laying of the wires of the armouring layer.

According to a fifth embodiment, the armouring layer comprises reinforcing wires having a slightly rounded shape. Thus, when plays appear between wires, they are filled by the return to the initial shape of the reinforcing wires.

The invention claimed is:

1. A method of manufacturing a flexible pipe comprising at least one tensile armouring layer including elongate reinforcing elements arranged helically around the axis of the pipe, the elongate elements having a width L and forming an angle $\alpha$ in relation to the axis of the pipe, wherein the play separating two contiguous elements, measured on said circumference, is less than $$\frac{1.5 \cdot L}{\cos\alpha}.$$

2. A method as claimed in claim 1, wherein the sum of the plays between the elongate elements measured on the circumference of the tensile armouring layer is less than 5% of said circumference, preferably less than 3%.

3. A method as claimed in claim 1, wherein the number of elongate elements is calculated considering the angle of inclination of the helix in relation to the axis of the pipe, the dimensions of the sections of the elongate reinforcing elements and the mean diameter of the tensile armouring layer.

4. A method as claimed in claim 1, wherein the number of intermediate elongate elements of known dimensions to be arranged in the plays between the elongate reinforcing elements is calculated considering the number of elongate reinforcing elements, the angle of inclination of the helix in relation to the axis of the pipe, the dimensions of the sections of the elongate reinforcing elements and the mean diameter of the tensile armouring layer.

5. A method as claimed in claim 1, wherein the thickness of the coating applied onto the elongate reinforcing elements is calculated considering the number of elongate reinforcing elements, the angle of inclination of the helix in relation to the axis of the pipe, the dimensions of the sections of the elongate reinforcing elements and the mean diameter of the tensile armouring layer.

6. A method as claimed in claim 1, wherein the elongate reinforcing elements of an armouring layer are clamped to one another.

7. A method as claimed in claim 1, wherein the plays between the elongate reinforcing elements are filled in with a filling material.

8. A flexible pipe comprising a tensile armouring layer including elongate reinforcing elements arranged helically around the axis of the pipe, the elongate elements having a width L and forming an angle α in relation to the axis of the pipe, wherein the play separating two contiguous elements measured on said circumference is less than $$\frac{1.5 \cdot L}{\cos\alpha}.$$

9. A flexible pipe as claimed in claim 8, wherein the sum of the plays between the elongate elements measured on the circumference of the tensile armouring layer is less than 5% of said circumference, preferably less than 3%.

10. A flexible pipe as claimed in claim 8, wherein the elongate reinforcing elements are coated with a layer of a plastic material.

11. A flexible pipe as claimed in claim 10, wherein the plastic material is selected from the group consisting of: polyamide 11, polyurethane and polyvinylidene fluoride.

12. A flexible pipe as claimed in claim 11, wherein a layer made of the same material as the intermediate elongate element covers the armouring layer.

13. A flexible pipe as claimed in claim 11, wherein the intermediate elongate element is made of a material selected from the group consisting of: steel, polyamide 11, polyurethane and polyvinylidene fluoride.

14. A flexible pipe as claimed in claim 8, wherein an intermediate elongate element is arranged between two elongate reinforcing elements.

15. A flexible pipe as claimed in claim 14, wherein the intermediate elongate element is of rectangular section.

16. A flexible pipe as claimed in claim 14, wherein the intermediate elongate element is of T-shaped section.

17. A flexible pipe as claimed in claim 14, wherein the intermediate elongate element is of U-shaped section.

18. A flexible pipe as claimed in claim 8, wherein the elongate reinforcing elements are clamped.

19. A flexible pipe as claimed in claim 8, wherein the plays between the elongate reinforcing elements are filled in with a filling material.

* * * * *